United States Patent [19]
Bears

[11] Patent Number: 5,320,369
[45] Date of Patent: Jun. 14, 1994

[54] AIR BAG TOY

[76] Inventor: James A. Bears, 3317 Nixon Drive, Osgoode, Ontario, Canada, K0A 2W0

[21] Appl. No.: 959,132

[22] Filed: Oct. 9, 1992

[30] Foreign Application Priority Data

Oct. 11, 1991 [CA] Canada ............................. 2,053,414

[51] Int. Cl.$^5$ .............................................. B60V 1/00
[52] U.S. Cl. ....................................... 280/18; 280/206; 180/124; 180/125; 446/176; 446/202; 446/220
[58] Field of Search ................. 180/124, 125, 10; 280/206, 18, 18.1; 446/176, 179, 178, 61, 202, 220, 225; 441/129, 65, 66

[56] References Cited

U.S. PATENT DOCUMENTS

| | | | |
|---|---|---|---|
| 2,840,194 | 6/1958 | Mitchell et al. | 188/87 |
| 3,156,483 | 11/1964 | See | 280/18 X |
| 3,246,426 | 4/1966 | Sawyer | 46/88 |
| 3,375,893 | 4/1968 | Mackie | 180/124 |
| 3,416,626 | 12/1968 | Nagamatsu | 180/124 |
| 3,760,899 | 9/1973 | Crossman et al. | 180/125 |
| 4,102,542 | 7/1978 | Pirre, Jr. et al. | 180/10 X |
| 4,192,395 | 3/1980 | Barber | 180/6.5 |
| 4,272,856 | 6/1981 | Wegener et al. | 5/81 R |
| 4,331,340 | 5/1982 | Bolen | 441/65 X |
| 4,789,039 | 12/1988 | Bjork | 180/124 |
| 4,895,384 | 1/1990 | Kaiser | 280/206 |

FOREIGN PATENT DOCUMENTS 1137143 12/1982 Canada ............................. 280/18.1

Primary Examiner—Karin L. Tyson
Assistant Examiner—Peter English
Attorney, Agent, or Firm—Dressler, Goldsmith, Shore & Milnamow, Ltd.

[57] ABSTRACT

A flexible, low friction, rideable sliding toy is disclosed that slides over relatively smooth, firm surfaces with very low friction. The toy is comprised of a bag of flexible, air impermeable material having one or more relatively large holes cut out of the bottom of the bag where the bag contacts the floor when in use. The bag is inflated by allowing it to drop onto the floor, trapping air inside it as it lands. The outer edges of the hole form a relatively air-tight seal allowing the bag to retain its inflated state when laid upon by a user, thus permitting a user to propel himself over flat surfaces in a low friction manner.

4 Claims, 6 Drawing Sheets 5,320,369

AIR BAG TOY

TECHNICAL FIELD

This invention relates to rideable sliding toys for sliding over relatively smooth firm surfaces. In particular, it relates to an unpowered toy consisting of an inflated air bag which is capable of being laid upon by a user and ridden over relatively smooth surfaces such as a floor due to the low friction between the bottom of the bag and the floor.

BACKGROUND ART

One example of a sliding toy is described in U.S. Pat. No. 3,416,626, issued to Brian H. Nagamatsu on Mar. 9, 1967. The aforementioned patent describes a rigid, powered, ground effect toy which rides above the surface of the ground to provide what is described as a "ground effect vehicle". While Nagamatsu provides a low friction toy upon which users can ride over relatively smooth and regular surfaces, Nagamatsu nevertheless requires a source of power to provide air pressure to enable the device to operate, resulting in a relatively more complex and expensive toy. Moreover, Nagamatsu teaches a non-flexible toy, resulting in a larger embodiment.

U.S. Pat. No. 4,272,856 to Wegener describes another related but quite different invention. This patent teaches a powered, ground effect patient mover for emergency use in the field. This device makes use of a flexible plenum which surrounds a rigid planar backing. An externally powered air source generates sufficient pressure to inflate the plenum and expel air from small diameter perforations on the bottom at a rate which lifts the device entirely off the ground in order to move in a relatively friction free manner. However, this device does not rest on the ground nor seal the air within and so operates on different principles with different design requirements from the present invention to be described. Moreover, it once again requires a source of power, resulting in greater complexity and cost, and is relatively non-flexible, resulting in a larger embodiment.

U.S. Pat. No. 3,375,893 to Mackie describes another related but quite different invention. This patent teaches a rigid topped, air impermeable load bearing air cushion. Various means are described to introduce air under higher pressure than within the air cushion from an external air source into the region centrally beneath the cushion. This higher pressure air lifts the cushion entirely above the underlying surface to allow frictionless travel in any direction. As before, however, Mackie requires a power source, and teaches a large non-flexible embodiment.

DISCLOSURE OF INVENTION

The present invention provides a flexible bag of air impermeable material such as polyethylene or vinyl sheet or other similar material having in its bottom a relatively large area of high air permeability such as a hole. When placed upon a smooth surface with air trapped within the bag and the area of material surrounding the hole in relatively airtight contact with the smooth surface, a user may lie upon the bag and be supported by the cushion of air formed within the bag. Because most of the weight of the user is supported by the air within the bag pressing on the floor in the open hole area, the contact area of the bag with the floor bears only a fraction of the total weight of the rider upon the surface on which it rests. Thus, there is relatively low friction between the bag and the surface upon which it rests, and the user may physically propel the bag forward, causing the bag to slide over the surface. A transverse belt across the hole may be left in place to maintain the desired shape of the bag and in particular the hole under the pressure generated by the weight of the person riding the bag.

In summary, there is disclosed a flexible, low friction, rideable device for use on a smooth floor or other surface consisting of an air bag having at least one relatively large hole in the bottom thereof. In use, air is trapped within the bag by the area of relatively air impermeable material surrounding the perimeter of the hole in the bottom of the bag which is in contact with the floor or other surface, thus forming an air seal. To use the invention, a user may inflate the bag simply by dropping it from a height above the floor, allowing the bag to catch air as it falls to the floor and thus trapping air inside it as it lands. The bag material surrounding and forming the edges of the hole then forms a relatively air-tight seal with the floor, allowing the bag to retain its inflated state when laid upon by a user. In effect, once the bag is inflated and lying on the floor, it forms a sealed air cushion which may be safely laid upon by a user for a period of time before deflation occurs. During this time, the bag provides a relatively low friction contact with the floor, allowing users to use their hands and/or legs to push themselves around the floor in a low friction manner.

There is further disclosed a flexible loop of material for use with the air bag, providing a self-contained sliding surface within which the air bag may be ridden.

According to one broad aspect of the invention, there is disclosed a toy for use by a person to allow a person to slide upon a relatively smooth firm underlying surface such as a floor, characterised by a flexible bag forming a relatively air tight enclosure when inflated and placed upon the surface, and having a region comprising a substantial portion of a bottom in contact with the surface removed, whereby substantially lower friction between the surface and the bag is achieved.

According to a further broad aspect of the invention, there is disclosed a toy for use by a person to allow a person to slide upon a relatively smooth firm underlying surface such as a floor, characterised by bladder means which may be laid upon by a person in a stable manner when at least partially filled with air, the bladder means being made of flexible relatively air impermeable material having a relatively airtight top and sides, and having a relatively air tight bottom having an area of contact with the floor when the toy is in use, the area of contact having within it a region of high air permeability over a substantial portion thereof and providing a relatively air tight relatively low friction seal between the bottom and the floor.

According to a yet further broad aspect of the invention, there is disclosed an apparatus for temporarily supporting a weight above a relatively smooth underlying surface such as a floor to permit the weight to be moved in a relatively low friction manner above said underlying surface. The apparatus comprises a top support surface means made of air impermeable material having a length and width sufficient to support the weight above the underlying surface when the apparatus is in use, and a bottom support surface means made of relatively thin flexible air impermeable material having a length and width sufficient to support the weight above the underlying surface when the apparatus is in use, and having a relatively smooth bottom surface where it contacts the underlying surface when the apparatus is in use. Air confining means are defined between the top support surface means and the bottom support surface means providing a substantially air tight region therebetween defining an air enclosure beneath the top surface support means capable of containing sufficient air to support the weight above the underlying surface when the apparatus is in use. A region of air permeability is located over a substantial portion of the bottom support surface means whereby a relatively low friction relatively air tight seal is obtained between the portion of the bottom support surface means and the underlying surface when the weight is placed upon the apparatus in a centred, balanced manner when the apparatus is at least partially filled with air.

Accordingly to a further broad aspect of the invention, there is disclosed an apparatus for use with a sliding toy to provide a relatively smooth sliding surface, characterized by a closed loop of relatively stiff flexible material having a relatively smooth inner surface, the loop having a width and a diameter sufficient to permit a person to operate the sliding toy upon the inner surface so as to cause the loop to roll.

BRIEF DESCRIPTION OF DRAWINGS

In the description which follows, reference is made to the accompanying drawings in which.

BEST MODE FOR CARRYING OUT THE INVENTION

Figure 1:
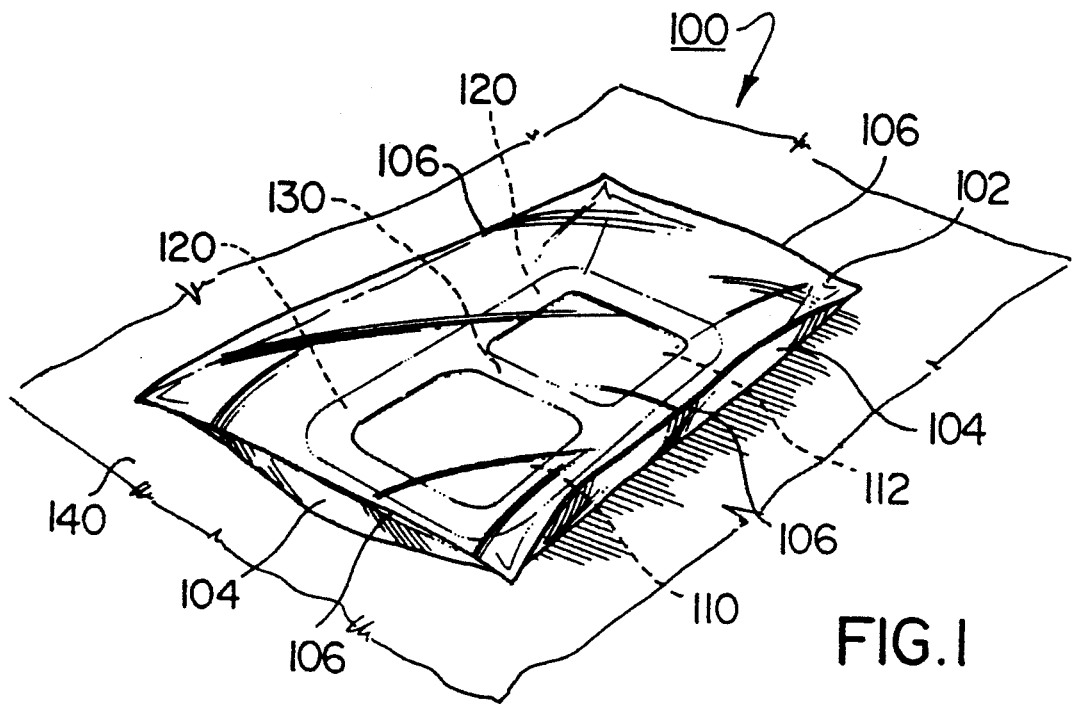
FIG. 1 is a perspective view of an air bag of the invention made of transparent material shown in inflated condition.

With reference to FIG. 1, the invention consists of a bag or bladder, designated generally as 100, made of a flexible, air impermeable material such as vinyl, polyethylene or other similar such material.

A convenient material for this is vinyl (PVC) sheeting. The thickness of the vinyl sheeting should be nominally between approximately 6 and 15 mil (thousandths of an inch where one inch equals 25.4 mm) with 12 mil having been found to be a good choice. However, other thicknesses outside this range will also function provided that they are sufficiently strong and flexible. In addition to vinyl, polyester sheeting (often sold under the trade-mark Mylar) and polyethylene sheeting have been found to work well. However, some vinyl will not work well outdoors in extreme cold weather conditions. In such a case, mylar or polyethylene material would be preferable. If desired, combinations of these various materials and thicknesses may be suitably used in the manufacture of the bag. Suitable types of smooth leather would also function.

BAG MANUFACTURE

The simplest functioning bag has a top surface 102 and a bottom surface 104 as shown in FIG. 1. In the particular embodiment shown in FIG. 1, the top 102 and the bottom 104 are fabricated from generally rectangular pieces of material, joined together along a seam 106 so as to form an airtight seal between the top and bottom surfaces 102 and 104. Although not shown in the drawings, when joined together in this way, the two surfaces will form an essentially rectangular bag when seen in uninflated condition from above. When inflated however, such a bag will appear generally as shown in FIG. 1. As seen from below in FIG. 2a, the bag will no longer appear rectangular, but may show deformation of the sides due to the inflation of the bag. When inflated, the bag assumes an essentially pillow shaped configuration as shown.

The bag may of course be formed in any other practical way, and may consist for example of a single piece of material folded over or 'wrapped around' so that opposite side edges of the material are adjacent. A side seam down one side of the bag only may then be formed along these two adjacent side edges, and the two ends seamed together as before. What is important is merely that there be provided a relatively air tight bag when in use of appropriate dimensions to provide a cushion of air for the user.

Figure 10:
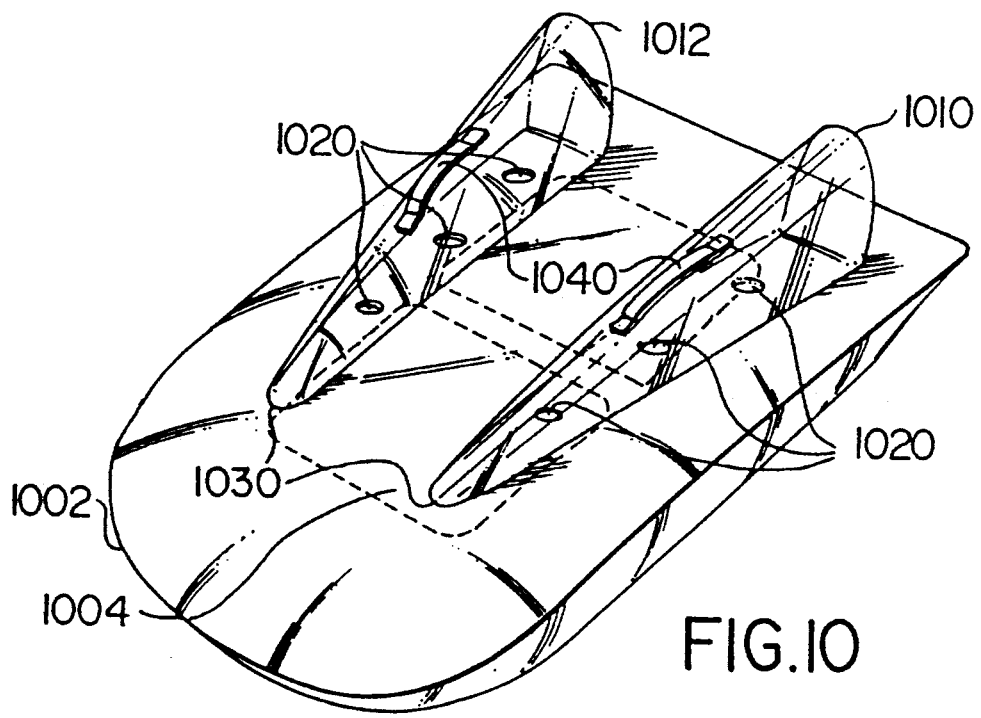
FIG. 10 is a perspective view of a further embodiment of the air bag of the invention.

Moreover, the bag need not be rectangular in shape, but may have more rounded corners than shown, for example, or a somewhat rounded front end as shown in FIG. 10. The design may be any convenient shape and size which will provide an air bag which, when inflated, properly supports the body of the user while allowing the bag contact area with the floor to be minimized.

THE HOLES

In order for the invention to function in the desired manner, it must have at least one relatively large highly air permeable area in the bottom surface 104 offering relatively little resistance to inflation of the invention when held and dropped bottom down to the floor. The simplest form of such a region would be a hole, and the embodiments of the invention described hereafter will be described utilizing one or more holes, although a suitably highly air permeable material would also function effectively. The optimum size of the area (i.e.-the hole) depends upon the size and shape of the user and will be further described herein.

By contrast, top surface 102 of the bag has no holes in it and is what supports the rider when lying on the bag. As a safety measure, one or more small perforations may be made in the top surface 102 in centrally located areas provided that these will be sealed by the user's body when riding the toy. These holes may help to prevent suffocation by small children. However, unless the holes are substantially sealed by the user when riding, the holes will render the invention less workable by hastening deflation. In all cases, when the air bag is being ridden, the top surface must provide a relatively air tight seal to the bag.

Thus, at least one centrally located highly air permeable region such as a hole is provided on the bottom surface 104 of the invention. For smaller sizes of the bag for use by small children, a single such centrally located hole may be sufficient. For most larger sizes of the invention however, it has been found beneficial to provide two such holes as will be explained hereinafter.

In the particular embodiment shown in FIG. 1, two such holes 110 and 112 are provided on the bottom surface 104 of the bag. This has been accomplished by means of a transverse belt of material 130 which has been left in place when cutting the hole, thus forming the two holes 110 and 112. This belt helps to maintain the shape of the bag and thus the hole so that air is sealed while the bag is being ridden. Without the belt, the sides of the air seal tend to buckle outwardly when a person lies on the bag, thus causing the air to escape more quickly, and in the worst case, suddenly deflating the bag. Thus, by providing two holes 110 and 112 as shown instead of one larger hole, a better working embodiment is achieved. This is particularly useful in larger bags, where the appropriately sized hole would be sufficiently large that it would tend to render an air seal that buckled outwardly towards the sides of the bag under pressure. Obviously, with smaller bags requiring smaller holes, as for small children, this would not be as important, due to their lower weight and smaller hole size requirements.

The region of contact of impermeable material (coinciding with area 120 shown in dotted outline in FIG. 1) between the bag 100 and the surface 140 after inflation of the bag acts as a low friction seal. Area 120 forming this region of contact is hereafter referred to as the air seal in this disclosure. The holes 110 and 112 are formed to provide an air seal as small in contact area as possible while maintaining a good air seal when in use. The smallest area of air seal gives the largest hole and the least sliding friction. However, if the hole is cut too large, the air seal 120 will be too small and the air will leak out when a person attempts to ride the bag or when the person tilts the bag during riding. Conversely, if the hole is too small, the air seal 120 (i.e. the contact area) will be larger than necessary, providing unnecessarily high friction between the air seal area 120 and the floor surface. Thus, the hole is cut as a compromise between low friction and ease of maintaining air within the bag while riding the bag.

Figure 2A:
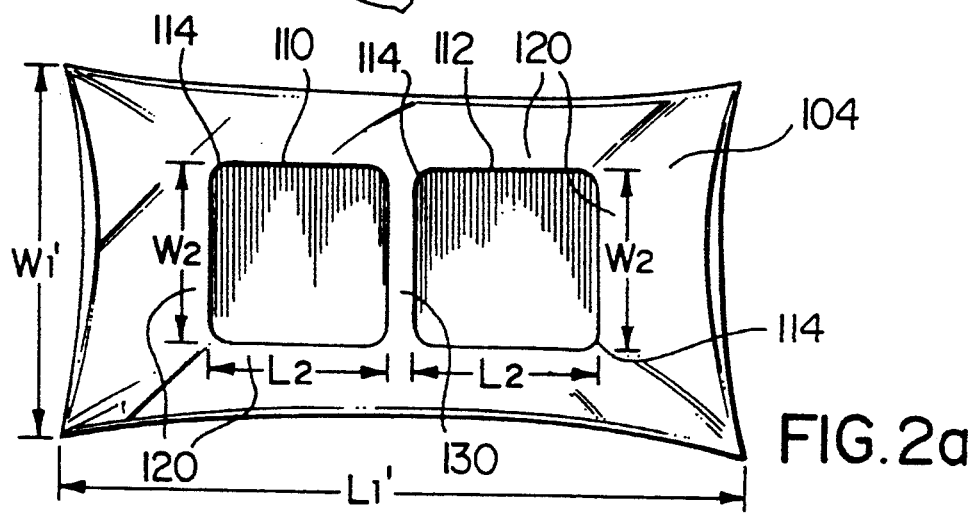
FIG. 2a is a bottom view of the air bag when in inflated condition.

The two holes provided in the bottom surface are generally rectangular in shape as shown in FIG. 2a in order to provide an overall hole area which is itself generally rectangular. The shape of the holes shown tends to produce the least friction while affording the greatest ease of inflation and allowing the rider to easily keep the air inside. The rounded corners 114 are provided simply to assist in preventing tearing of the bag material at those corners.

The hole or holes are generally rectangular and positioned to correspond generally with the area of contact between the user's body and the top 102. Since the area of contact of the user's body upon the top of the air bag is generally rectangular, the area of greatest pressure upon the floor will be the similarly shaped area on the bottom 104 lying directly underneath the user.

This may be better understood by considering that the area of intersection between the side of a cylinder and a flat plane is a rectangle. When in an inflated, sealed condition, the air bag acts much like a somewhat flattened flexible cylinder, lying on its side on the floor, and making a generally rectangular area of contact with the floor. Since the user is lying on top of the flexible cylinder, the area of highest pressure (and therefore friction) occurs in this rectangular area on the bottom. To cut out as much of this rectangular pressure area from the bottom of the bag as possible, a substantially rectangular hole will be needed, and the friction associated with that part of the bottom may be thus eliminated.

Figure 12:
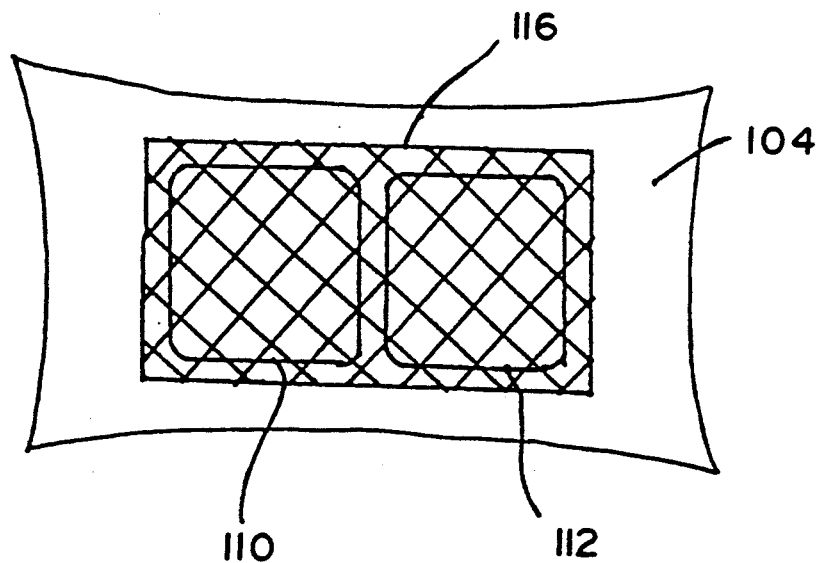
FIG. 12 is a bottom view of an air bag of the invention when in inflated condition showing optional webbing material mounted on the inside surface of the bag covering the holes.

Optionally, as illustrated in FIG. 12, the holes may be completely covered by a highly air permeable material 116 such as netting, screening, or perforated flexible plastic sheeting of material the same or similar to the material used for the bag construction. This material must present a low enough resistance to the passage of air that inflation of the bag is not significantly hindered when the invention is held and dropped bottom down to the floor. The material may be heat sealed or otherwise flexibly fastened to the inside of the bottom surface near the perimeter of the holes, in order to prevent small children from putting their heads into the bag. This may be of concern if the material used for the bags is such that suffocation is a possibility. In such a case, the permeable material will add slightly to the friction, and should therefore be as fine as possible in order to present as small a surface area as possible to the floor surface upon which it will rest and also to allow rapid air infusion during inflation.

Alternatively, this result may be achieved by providing a larger number of smaller rectangular holes in a grid pattern in place of the one or two large holes described. By so doing, this will provide the necessary air permeable area as well as a series of thin transverse and longitudinal belts of material running across the air permeable area from side to side and from top to bottom, providing reinforcement to the shape of the air permeable area at the same time.

Provided that the permeable material is installed such that it is not tightly stretched when the bag is inflated, it will not add appreciably to the friction. Because the relatively high air pressure area of the inside of the bag completely surrounds the permeable material, the air pressure acting upon the permeable material will be equalized above and below the permeable material. In such a case, the only additional friction added to the bag will be the friction that the permeable material itself produces due to its own weight, which will be minimal. If the permeable material is installed so that it becomes tight during inflation of the bag however, it may develop a force component acting upon the floor caused by tension holding it tightly against irregularities in the floor. In such a case, it may start to bear part of the load of the rider and/or start to snag if the floor surface has such irregularities, increasing the friction of the bag very considerably.

However, if desired, the permeable material may be attached at a central point to the inside surface of the top of the bag either directly or by means of a short vertical connecting piece of material (not shown) having a length short enough to hold the permeable material above the floor when the bag is inflated. This would have the effect of reducing the friction effect of the permeable material on the floor, as well as reducing snagging of the material by small imperfections in the underlying surface upon which the bag is being used.

DIMENSIONS

Figure 2C:
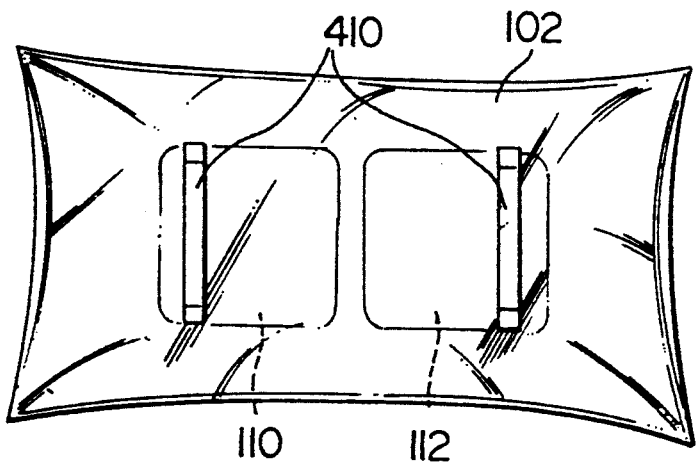
FIG. 2c is a top view of the air bag when in inflated condition showing the top surface of the invention, and showing the bottom holes in outline.
Figure 2B:
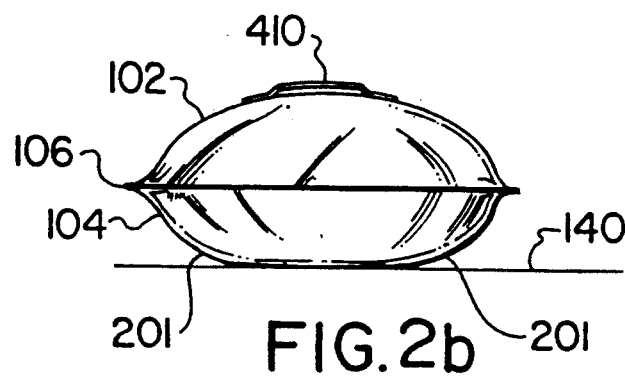
FIG. 2b is a end elevation view of the air bag when in inflated condition.
Figure 3:
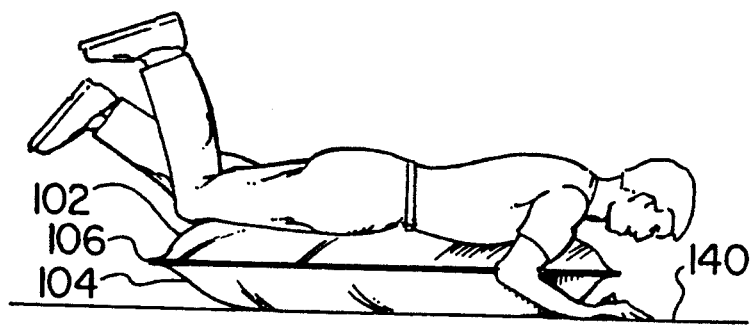
FIG. 3 shows a side elevation view of a rider on the air bag of the invention in inflated condition.

The optimum size and shape of the bag and hole or holes will depend to some extent upon the intended rider. It has been found that the bag is most comfortable when it is of a sufficient length to allow the user to lie supported by the bag from near the top of his or her chest to the mid-thigh area or slightly below, as shown in FIG. 3. The width should be sufficient to allow a user to propel the bag along the floor with his arms. Accordingly, a width somewhat less than the maximum elbow to elbow distance of the user with arms fully extended is appropriate. The height of the bag above the underlying surface is necessarily limited by the width and length of the bag, as no sides are provided in the bag, but are formed naturally by the inflation of the bag. FIG. 2b and FIG. 3 give an approximate indication of the height of the bag when in use.

Although most users would be able to use most size bags, it has been found that the best results are achieved when the width of the hole is generally approximately equal to or somewhat smaller than the width of the user's chest. By way of example, for a person 6 foot 2 inches (188 cm.) in height, a bag measuring approximately 50 inches (127 cm.) in length and 33 inches (83.8 cm.) in width when deflated has been found to be suitable. In such a bag, the two hole areas could be approximately 13 inches (33 cm.) long on each side, with the transverse belt between them approximately 2 inches (5.08 cm.) wide and 13 inches (33 cm.) long.

Best results are achieved when the air seal area is approximately 2 to 3 inches (5.08 to 7.62 cm.) wide all around when the bag in inflated and in use. Of course, the air seal area will expand outwardly somewhat as the bag deflates and more of the bottom surface 104 comes into contact with the floor. In the previous example, the holes would provide approximately ⅔rds or more of the total area of bag in contact with the ground. By proper sizing of the bags and holes for the individual rider, as much as 80% of the total load may be taken by the floor underneath the holes rather than the floor underneath the air seal.

The table below gives some approximate dimensions for the rectangular sheets of material to be cut to form the top and bottom of the bag that have been found to appropriate, along with the corresponding size of the two holes as shown in FIG. 2a. In the table, the dimensions L1 and W1 refer to the overall length and width of the top and bottom sheets before inflation respectively. Note that the dimensions marked as L1' and W1' in FIG. 2a are therefore somewhat shorter than L1 and W1 due to the inflation of the bag. L2 and W2 refer to the length and width of each of the two holes as also shown in FIG. 2a. In each example given, a transverse belt of roughly 2 inches (5.08 cm.) has been left between the two holes.

TABLE OF REPRESENTATIVE SIZES

| OVERALL BAG SIZE Length × Width (L1 × W1) | SIZE OF EACH HOLE Length × Width (L2 × W2) | Approximate Height of User |
|---|---|---|
| 50 inches × 33 inches | 13.0 inches × 13.0 inches | 6 feet |
| (127 cm. × 83.8 cm.) | (33 cm. × 33 cm.) | (182.9 cm.) |
| 45 inches × 30 inches | 12.0 inches × 11.0 inches | 5 feet 6 inches |
| (114.3 cm. × 76.2 cm.) | (30.5 cm. × 27.9 cm.) | (167.6 cm.) |
| 42 inches × 27 inches | 10.0 inches × 7.5 inches | 5 feet |
| (106.7 cm. × 68.6 cm.) | (25.4 cm. × 19 cm.) | (152.4 cm.) |
| 37 inches × 25 inches | 8.0 inches × 6.0 inches | 4 feet 6 inches |
| (94 cm. × 63.5 cm.) | (20.3 cm. × 15.24 cm.) | (137.2 cm.) |
| 34 inches × 22 inches | 6.0 inches × 3.5 inches | 4 feet |
| (86.4 cm. × 55.9 cm.) | (15.24 cm × 8.9 cm.) | (121.9 cm.) |

The internal air pressures developed by such bags are relatively moderate. As a rough example, for a 200 pound (90.6 kg.) rider lying on a bag and arbitrarily assumed to be making uniform contact over an area having a width of 15 inches (38.1 cm.) and a length of 40 inches (101.6 cm.), the total contact area between the user and the bag would be approximately 600 square inches (3870.96 sq.cm.), producing an approximate internal air pressure of 200 lb/600 sq.in.=0.33 psi (90.6 kg./3870.96 sq.cm.=0.0234 kg./sq.cm.) above atmospheric pressure. Thus it will be seen that relatively low pressures are produced within the air bag.

USING THE BAG

In inflated condition, air would naturally escape out of holes 110 and 112. However, when the bag is placed in inflated condition on a smooth surface 140 such as a floor, the area of material 120 surrounding the holes provides a relatively air tight seal, preventing the escape of much of the air inside the bag 100.

Figure 4A:
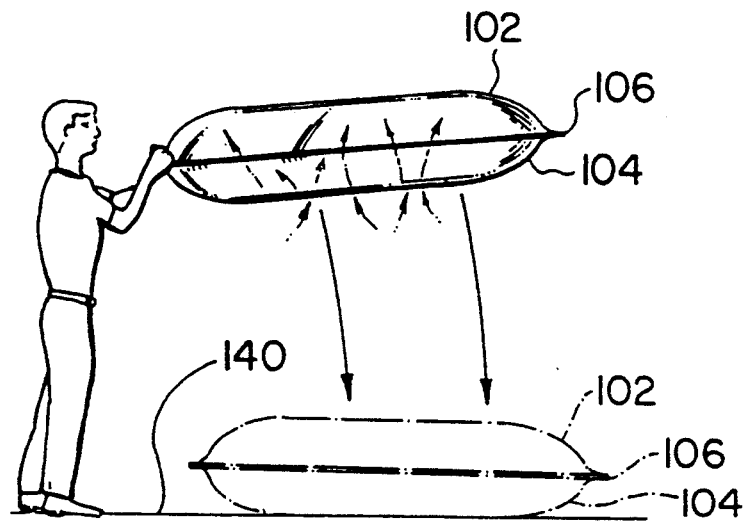
FIG. 4a is a side elevation view of the air bag illustrating one means of inflating the air bag.
Figure 4B:
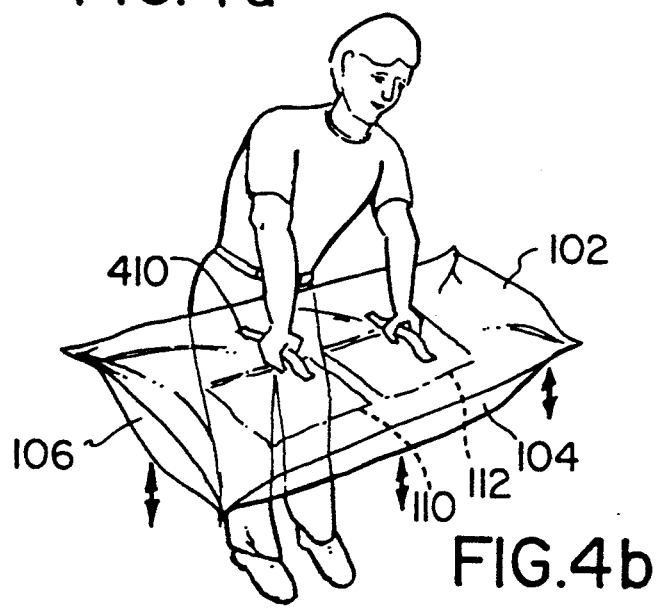
FIG. 4b is a perspective view of the air bag illustrating another means of inflating the air bag utilizing handles attached to the top of the air bag.

With reference to FIG. 4a, the bag may be inflated by lifting and extending it to its unfolded shape, then dropping or otherwise lowering it, bottom surface down, on to the floor. In such a case, the bag is inflated by holding it by both hands at one end and flipping it up much like a bed sheet as shown in FIG. 4a. As an alternative means of inflation, two handles 410 may be provided on the top surface 102 as shown in FIGS. 2b and 2c. The bag may then be grasped as shown in FIG. 4b by the two handles 410 and raised and then lowered, several times if necessary, in order to allow the bag to fill out with air. In either case, air is captured within the hole or holes in the bottom and is sealed by the air seal area of the bag around the hole when the bag is placed on the floor. Although the handles 410 are not necessary, the handles provide an easy and relatively foolproof manner to assure adequate filling of the bag without requiring any particular skill on the part of the user.

If a user places the bag in inflated condition upon a smooth floor, he will then be able to lie upon it. This is accomplished by the user positioning himself over the bag and lowering himself carefully onto the top of the bag from above such that the user's weight comes to bear upon the bag more or less evenly over the top of the bag and the user is lying upon the bag lengthwise as is shown in FIG. 3. In effect, the user stands with his feet on the floor near one end of the bag, bends over to place his hands on the floor on either side of the bag towards the opposite end, and then lowers his body gently onto the bag, much in the manner of performing a pushup.

Once lying upon the bag in inflated condition, as shown in FIG. 3, the weight of the user's body pressurizes the air inside the bag, forcing the bag material to tighten, and further ensuring that all of area 120 surrounding the holes 110 and 112 is pressed tightly against the floor or other smooth surface 140, further sealing the air inside the bag. Thus, a relatively air tight seal is formed, and the user is able to lie in a balanced manner upon the bag while maintaining the air seal around the hole or holes in the bottom of the bag, providing the user with an air filled bag or cushion upon which to rest. In this way, the user will be able to lie upon the bag, while maintaining the bag in an inflated condition for a significant period of time.

Once the user is lying on the inflated bag in this fashion, only a small portion of the user's weight is transferred by means of air pressure to bear down upon the air seal. This air seal area of the bag around the hole therefore forms a relatively low friction seal which enables the rider lying on the bag to slide easily along the floor while pushing with the hands and/or feet. The rider can slide and turn in any direction on the floor. The rider may also rotate the bag in position. Under the proper conditions, a rider may be easily able to sustain an inflated condition for two or more minutes.

THEORY OF OPERATION

The weight of the rider is sustained by the pressure of the air which is contained within the bag, pushing upward from underneath the material of the upper surface 102 of the bag. However, as most of the area of the bottom surface 104 under the rider consists of the holes, the body of air upon which the rider rests bears mainly on the floor. Air seal area 120 (the contact area) is the only part of the bag touching the floor surface, and as this forms only a relatively small proportion of the total area transferring load onto the ground (the bag contact area 120 PLUS the holes), most of the weight is born by the air upon the floor surface. Most of the rider's weight is transferred to the floor by air pressure exerted through the hole in the bag, pressing on the floor within the hole and effectively transferring the load while not generating any appreciable friction. The small fraction of remaining weight is transferred to the floor by the air seal area 120 around the hole which pushes against the floor. The air seal is pushed down by air pressure representing only a small fraction of the rider's weight, hence the static and dynamic friction of the bag against the floor is only a small fraction of what it would be without the hole.

In effect, the rider rides upon 'column' of air underneath him which is constrained by the side walls of the bag, and most of which presses in turn upon the floor within the open holes, with only a small part of the air pressing upon the air seal areas. The result is a relatively low friction interaction between the floor area and the bag.

In analytical terms, the air pressure developed within the bag is roughly equal to the weight of the rider divided by the area of contact between the rider and the top of the bag. (This does not allow for any effects due to uneven weight distribution over the body contact area, and any components of lift on the rider due to the tensile stresses within the membrane of the bag when the bag is partially deflated.)

This air pressure also acts upon the ground over the total contact area of the bag and hole to transfer the rider's weight (plus the weight of the bag which is relatively inconsequential) to the ground. Since the upward force to counteract the weight of the rider and bag is necessarily essentially the same as the downward force due to the weight of the rider, it will be seen that at any given moment, the total area of contact of the bag (including holes) with the floor will be approximately the same as the area of contact that the rider makes with the top of the bag (once again ignoring uneven weight distribution and force components due to tensile stress). Accordingly, in theory, the total size of the hole area will be limited at any given moment by the size of the area of contact of the rider upon the bag. Gravity acts vertically downwardly, and thus the contact area of the bag with the floor will be located vertically below the contact area of the rider with the bag. Moreover, as the hole is formed by in effect cutting away a major part of the contact area while still leaving an air seal area, the hole should obviously be somewhat smaller to allow for air sealing with the floor.

In practice, as the bag deflates, and the rider's body sinks into the bag, more of the rider's body area comes in contact with the top, thus reducing the internal pressure. Moreover, in a partially deflated condition, the tensile stress of the bag has upward components which act to lift the rider's body and thus further reduce the pressure in the bag, thereby also increasing the floor contact area and allowable hole size to seal air for that degree of deflation.

When the bag is initially inflated, it is nearly full of air and hence tends to form rounded to and bottom surfaces. The bottom of the bag in contact with the floor is compressed inwardly by the pressure of the floor against the bag until the area times the pressure opposes the weight of the rider above. Both the top and bottom surfaces of the bag are basically rounded and flattened somewhat by the force of contact with the rider's body on top and the pressure of the floor below. Since initially the bag is at or near full inflation and has a rounded top surface, the top surface contacts the rider over a relatively smaller area than when it is partially deflated.

As air leaks from the bag, the rider's body sinks and the air pressure drops as the top surface tends to sag and come into greater contact with the rider's body. Hence, the contact area with the floor increases as the bag is increasingly flattened to offset the constant weight of the rider above. The flattened cylindrical shape of the bag inherent from its construction tends to limit the amount of variation of body contact area of rider to bag and to minimize somewhat the upward tensile components of the material of the bag, lifting the rider's body. This shape also tends to even the pressure during deflation because the top membrane develops only a shallow concavity under the rider's body when the rider's torso compresses the top membrane to the bottom membrane on the ground. Hence the vertical component of the tensile stress in the top membrane is minimized. This evening of pressure assists in allowing one hole size to be adequate throughout the operating range.

Because of the highly flexible nature of the air bag, the tension created in the bag walls when the bag is inflated causes the portion of the bottom 104 of the bag near the air seal area to be pulled upwardly away from the floor as shown at the points marked 201 in FIG. 2b for example. This remains true when the rider's weight is applied to the top of the bag. By means of this "lifting" of much of the bottom surface material not necessary for the seal away from the ground, reduced seal area and thus lower sliding friction is achieved.

Obviously, the hole area must be located within the contact area of the floor when the rider is on top of the bag. Any portion projecting beyond the contact area will immediately start to cause rapid deflation.

In addition to the above, another factor leads to a further reduction in the friction of the bag against the floor. The air within the bag does leak out between the air seal and the floor, albeit quite slowly provided that the air seal is maintained. This leaking air acts to lubricate the contact area between the bag and the floor, namely the air seal, and thus to reduce further the friction of contact. While the air leaking out will not necessarily do so in a uniform manner in all directions, the lubrication effect is nevertheless an aid in reducing the overall friction.

ADDITIONAL ENHANCEMENTS

Figure 7:
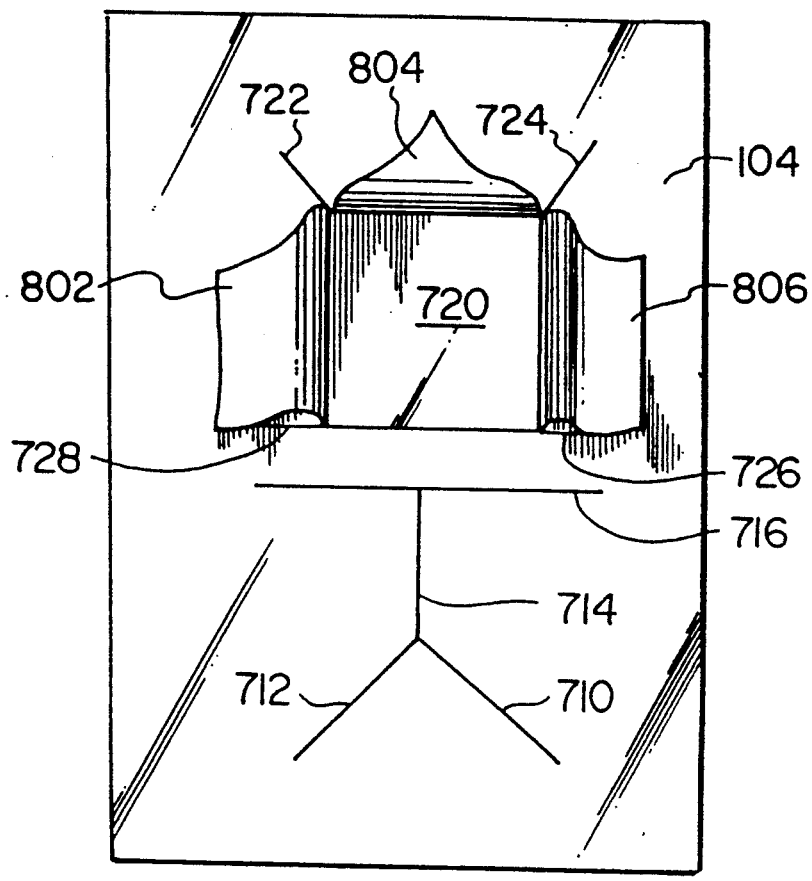
FIG. 7 shows a bottom view of an alternative embodiment of the air bag, illustrating an improved method of fashioning the holes.

In order to better cater to the differing size requirements of users, an improved method of providing the holes is shown in FIG. 7, which shows one of the two holes fully formed in the bottom surface (the upper hole as seen in FIG. 7) and the cut lines for the other hole prior to cutting. In this embodiment, diagonal cut lines 710 and 712, in combination with vertical cut line 714 and horizontal cut line 716 provide a method of making cuts to provide an adjustable size hole which will produce the desired rectangular hole as before, as shown in the upper hole 720 which is depicted already cut out.

Figure 8:
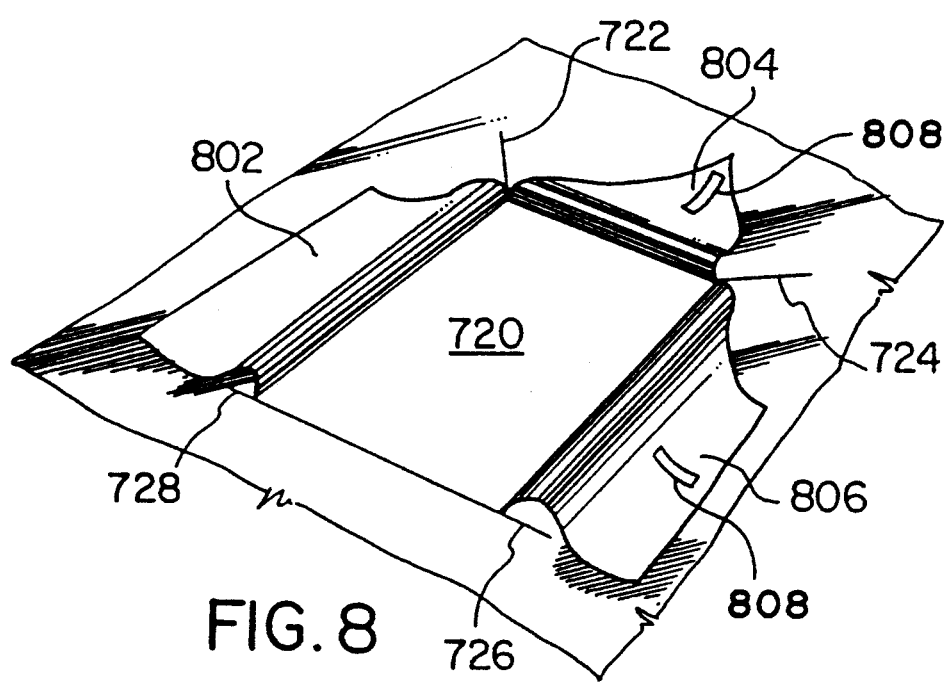
FIG. 8 shows a detail in perspective of the alternative embodiment of FIG. 7 as seen from within the air bag, showing the flaps surrounding a hole in the bottom surface of the air bag.

In addition, however, because the excess material at this point is not removed from the air bag as before, but remains attached, it is possible to form folds or flaps projecting internally into the bag as further shown in FIG. 8, which can be held in place by any suitable means 808 including heat sealing, tape, VELCRO (trade-mark), or other relatively flexible fastening means. The hole may thereafter be made larger by the user continuing the cuts along the lines 722, 724, 726 and 728 to enlarge the hole. The extra material may be simply folded back and fastened by the user with tape or VELCRO. Conversely, the hole may be made smaller by the user simply flattening down the folds somewhat if heatsealed, or else readjusting their size, and thereafter taping or otherwise securing any desired portion of the cut lines 722, 724, 726 and 728 with any kind of suitable tape or flexible fastening.

Depending upon the type of materials used to make the bag, the insides of upper surface 102 and lower surface 104 may tend to stick together. This is particularly the case where both top and bottom are made of vinyl. This may be remedied by putting dust or some other such material such as baby powder inside the bag. However, it is not generally necessary after a bag has been used a number of times, as some dust will naturally accumulate within the bag. Alternatively, one or both of the top and bottom of the bag may be made from a material having a textured or otherwise non-smooth surface on the inside of the bag in order to assist in avoiding this problem.

Too much dust or dirt accumulating within the bag may be an annoyance when the bag is in use. To avoid this, folds 802, 804 and 806 shown in FIG. 8 serve an additional purpose in that they assist in keeping sand and dust from entering into the inside of the bag when in use. While a certain amount of dust will enter the bag inevitably, the folds tend to naturally ride up and over rather than cut through wet beach sand, for example, or other such surfaces which would tend to fill the bag.

Figure 11:
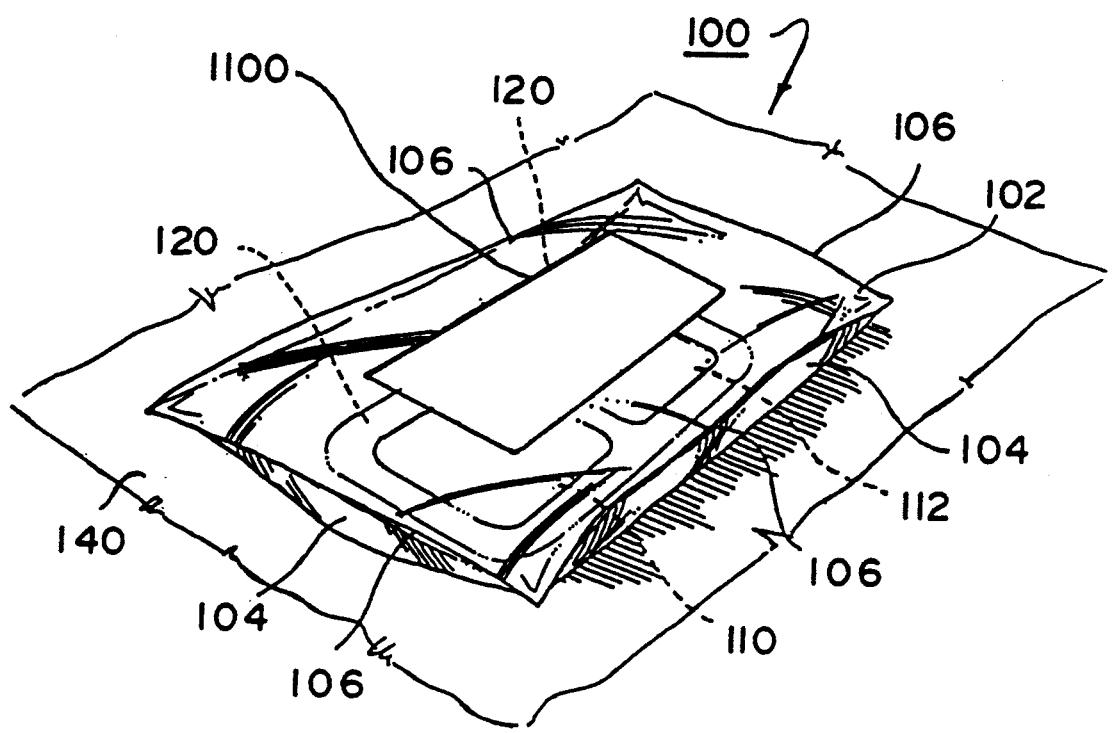
FIG. 11 is a perspective view of a further embodiment of the invention depicting an air bag of the invention having a relatively inflexible surface area over a portion of its top surface.

If desired, an area of inflexibility 1100 may be provided in the top surface of the bag somewhat larger than the hole area, located above and 'covering' the hole area in the bottom surface beneath, as shown in FIG. 11. This could be done for example by attaching a sheet of relatively stiff plastic or other material to the top of the bag in the appropriate area. This would furnish the advantage of ensuring more even weight distribution over the top surface of the bag. Moreover, it would allow small children to ride on air bags having a hole area which would otherwise be too large for them to sustain inflation. By ensuring that the child's weight presses over the entire area of the hole below, inflation may be properly maintained. Any such inflexible area would of course limit the degree to which the air bag could be folded up and stored. Accordingly, the inflexible area can be provided for example as a series of two or more adjacent rectangles of stiff material, allowing the flexible material of the bag between the rectangles to provide a folding region to permit the toy to be folded up into a more compact form for storage. If an inflexible area is provided on top, its size should preferably be the same size as or not too much larger than bag contact area of the bottom with the floor as any further rigidity imparted to the top surface will increasingly detract from the functionality of the air bag as the area of inflexibility is increased.

Figure 9:
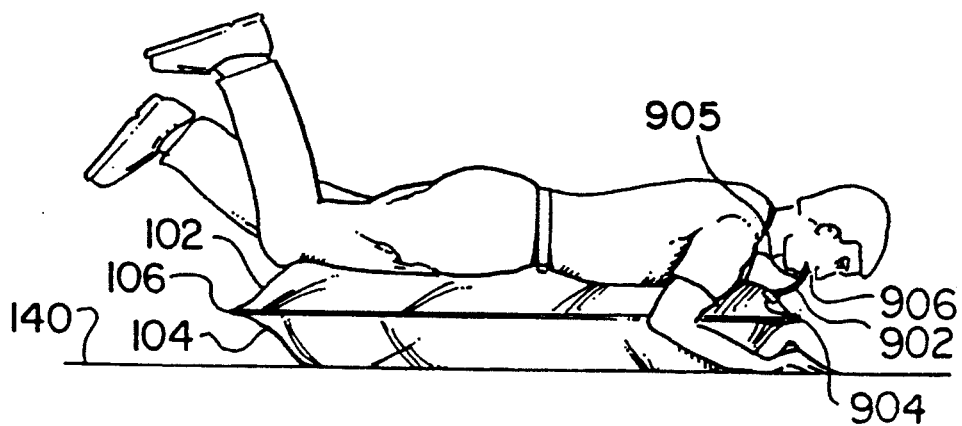
FIG. 9 shows a side elevation view of a further embodiment of the air bag.

FIG. 9 illustrates a further embodiment of the invention. In this embodiment, the user inflates the air bag in the fashion described above. However, an air hose 902 is provided near one end of the bag. The hose must be of a sufficient diameter to allow rapid exhalation into the bag without undue resistance. A diameter of approximately ¾ of an inch (1.9 cm.) has been found to be suitable, although larger or smaller diameters would of course also function. The air hose connects into the interior of the bag by means of a one way flap valve 904. A mouth piece 906, which in practice may be simply an end of the air hose 902, is provided into which the user may blow air. Optionally, an additional one way valve 905 in the mouth piece 906 or in the body of the pipe near the user's mouth will allow the user to inhale through the air hose without breaking the seal of the user's mouth around the mouthpiece. By blowing at regular intervals through the air hose 902, the rider may sustain the air bag in an inflated condition for much longer periods of time.

FIG. 10 illustrates a further embodiment of the invention utilizing a slightly rounded front and fins to provide a more exciting visual appeal to the bag for children. In this case, the bag has a somewhat rounded front portion 1002. Notwithstanding this, hole 1004 will not usually have a similarly rounded portion in view of the requirement to maintain a good air seal area 120. Therefore hole 1004 should generally retain its rectangular shape. In addition, fins 1010 and 1012 are provided towards the rear end along each side of the top surface 102 as shown. Fins 1010 and 1012 are made of similar flexible material to the rest of the bag and are heat sealed onto the top surface 102 in an air tight fashion to form a closed air cavity. Prior to so doing however, one or more small holes 1020 are provided in top surface 102 under each fin in order to allow passage of air between the interior of fins 1010 and 1012 and the interior of the bag 100. These holes ensure that as the user inflates the bag 100 and places his weight on the bag, the fins will be fully inflated with air forced through the holes 1020. The fins should be positioned so that the head 1030 of the fin is attached to the bag approximately at or below where the user's armpits would naturally be located when riding the air bag. The space between fins 1010 and 1012 should be at least equal to the body width of the user to permit the user to lie between them. Handles 1040 are provided on the fins adjacent the midpoint of the bag as shown in order to assist in inflation.

As well as providing visual appeal, the fins serve a useful purpose in that they form a natural body positioning aid for users, and in particular for small children, who otherwise may tend to mount the bag in an unbalanced manner. By placing the fins in this manner, users are encouraged to mount the bag in a balanced manner from a standing position at the rear of the bag from behind the fins. Moreover, the fins add strength in the longitudinal direction, and thereby assist in preventing the bag from buckling when it is picked up by the user to inflate the bag. Thus the fins also aid in inflation of the bag.

Figure 5:
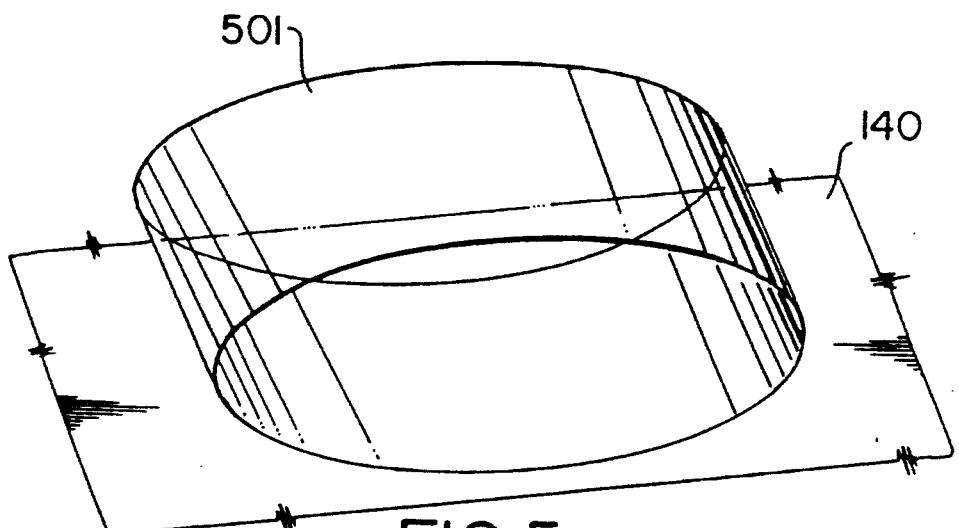
FIG. 5 is a perspective view of an auxiliary elliptical slide for use with the air bag.

An additional element which may be added to any of the embodiments discussed herein is one or more attachment points on the air bag to allow a pull rope or string to be attached. Suitable attachments points (not shown in the drawings) would be on the top surface of the bag near the front seam, either in the middle of the front of the bag, and/or towards the outside edges of the front of the bag. This would allow a user riding on the air bag to be pulled along by another individual on foot at greater speed.

Where it is desired to ride the invention over rough surfaces over a length longer than is practical to roll a strip of plastic, an auxiliary device called the Wave shown in FIG. 5 can be used. This consists of a loop 501 or ellipse of self supporting, flexible and transparent material which is stiff enough to support the weight of its top surface above the ground, while being flexible enough to roll easily. Suitable materials for this include stiff bendable polyester sheet, styrene or polyethylene, of suitable thickness to support the upper surface of the loop above the rider on an air bag within the loop while in use. The loop can be made of a transparent material so that the riders of the air bag within could see where they were going. In addition, corrugated plastic (sold under the trade-mark COROPLAST) with a thickness of approximately 4 mm. for example may be used as the material for the loop. This material has the necessary flexibility to fold into a loop while retaining its strength, particularly where the corrugations run the length of the loop instead of transversely.

Figure 6:
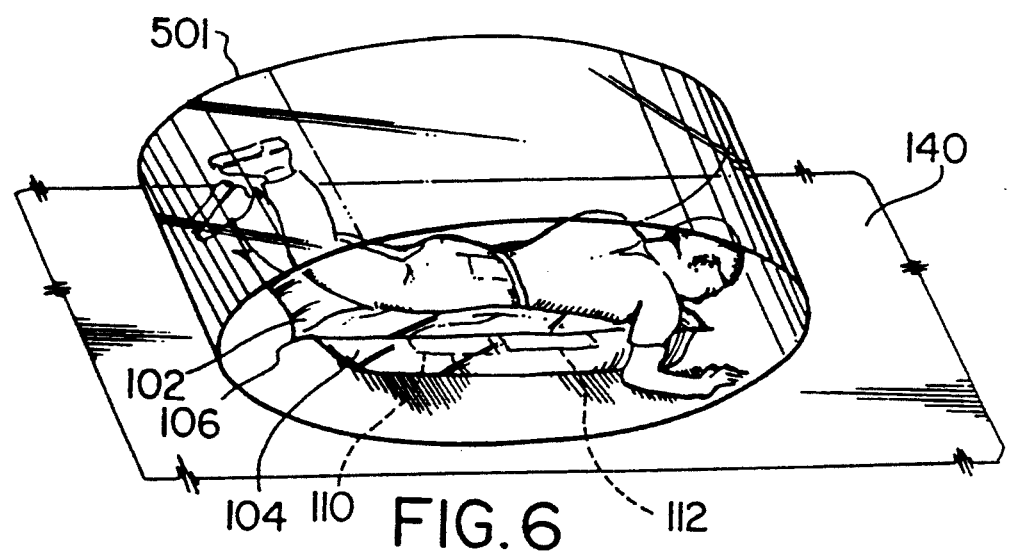
FIG. 6 is a perspective view of a rider on an air bag within the elliptical slide, showing how the rider uses the elliptical slide to allow the air bag to slide continuously over rough and/or porous surfaces.

The dimensions of the loop must be of a suitable width and circumference for the individual user to permit its use as further described. The air bag slides on the lower inside surface of the loop, as seen in FIG. 6. When the air bag slides forward within the loop, the front of the loop begins to be pushed down and consequently the loop begins to roll along continuously in front of the air bag and the rider thereupon. The loop could be used to allow the air bag to slide easily down long grass or other surfaces which would otherwise cause too much air leakage from the air bag. The loop would also allow the air bag to be used over rough pavement or concrete.

Depending upon the size of the loop used, more than one air bag and rider could be accommodated at one time.

INDUSTRIAL APPLICABILITY

The result of the invention is a very light and foldable toy, that can be carried in a small space such as a lunch box or a school bag. The toy can be unfolded and inflated as described and then laid on. Once resting on the bag, as shown in FIG. 3, the rider can slide with very low friction on smooth surfaces such as wood, linoleum, tile, polyethylene sheets or other such smooth surfaces, smooth ice and packed snow, corrugated plastic sheeting, concrete floors, smooth road pavement and some types of wet beach sand. The resulting motion is very pleasurable, not unlike flying, and may be easily incorporated into games such as racing or it may become part of new games involving balls, sliding pucks and score zones, for example as briefly described below.

Two or more riders can pursue each other and play in various games such as tag. The pursuant can place a hand under the air seal of the bag of the pursuee, for example, causing all the air to escape and the pursuee to fall off in a sort of 'tackle'.

On surfaces such as a floor hockey court or a basketball court, organized games could take place using the invention. Strips of carpet can be laid down to form paths and to transform the playing field into various curves which lead to a goal area. Carpeted areas can be utilized as penalty zones in games since the air leaks out more rapidly over these. Riding over a carpeted zone would result in air loss and would act as a penalty of sorts. No more than a very few such "jumps" could be enacted before running out of air, requiring the rider to stop, and refill the bag.

One way of scoring a goal would be to follow the paths between carpeted zones leading to the goal and to enter without refilling the bag while overcoming the opposite team's attempts to deflate the bag. Other ways of scoring could involve passing sliding pucks or rolling balls through the goal zone as in floor hockey, or football.

There are many ways to use the invention outdoors, or on other rough surfaces. One way to do this on relatively smooth surfaces such as short grass is to roll out plastic strips such as vinyl or polyethylene, as wide or wider than the invention, on the ground thereby making an area on which the air bag can maneuver with little friction or air loss. On rougher surfaces, strips of plastic, such as corrugated polyethylene or corrugated polypropylene having a smooth top surface (such as COROPLAST (trade-mark)) could be laid out. Where this is done on a slope for example, the air bag could then be ridden down the slope with little friction and at exciting speed.

Alternatively, the previously described loop may be employed in order to provide a means for sliding where it is desired to ride the air bag over rough surfaces over a length longer than is practical to roll a strip of plastic.

The invention provides a toy which provides healthy and entertaining exercise for a user. The use of the invention exercises the back and neck muscles, as well as the legs, arms and chest muscles, providing an invigorating and enjoyable entertainment.

It will be understood that the above description is not to be taken as limiting the scope of my invention. Numerous modifications may be envisaged, such as providing extra air storage by adding compartments to better accommodate the riders, varying the number and location of the transverse belts or altering the size and location of the holes, for example. The invention need not be pillow-shaped, but may be any functioning size and shape that would allow a rider to ride thereon. While the embodiments described provide a relatively stable bag for riding, bags which are less stable may also be desirable as providing more of a challenge in maintaining balance and therefore inflation. Moreover, the size of the bag is not necessarily constrained to a size permitting a rider to propel himself by hand along the ground as described. Larger bags could be provided which could be pulled by others. A powered source of air pressure could also be applied to maintain the internal air pressure of the bag. Although principally intended as a toy, it is obvious that the invention could also be used to permit loads other than people to be temporarily supported and moved in a low friction manner. The scope of my invention is to be limited only by the claims which follow.

What I claim is:

1. A toy for use by a person to allow a person to slide upon a relatively smooth firm underlying surface such as a floor, characterised by
    flexible bag means forming a relatively air tight enclosure when inflated and placed upon the underlying surface,
    a region defined by removing a substantial portion of a bottom of the flexible bag in contact with the surface, and
    a pair of fin means made of flexible air impermeable material symmetrically located on the top of the toy on opposite sides of an axis located over the centre of the region when the toy is in use, the fin means being sufficiently spaced apart to permit a person to lie therebetween, each fin means forming a relatively air tight cavity and having at least one air aperture between the interior of the enclosure and the cavity permitting the relatively free flow of air,
    whereby substantially lower friction between the surface and the bag is achieved.

2. A toy for use by a person to allow a person to slide upon a relatively smooth firm underlying surface such as a floor, characterized by a flexible bag forming a relatively air tight enclosure when inflated and placed upon the surface, and having a region defined by removing a substantial portion of the bottom of said flexible bag in contact with the underlying surface, said region including at least one relatively large aperture defined by a plurality of cuts in the bottom of said flexible bag, said cuts being arranged so as to define flaps of material which may be pulled back to form the aperture, whereby substantially lower friction between the surface and the bag is achieved.

3. The toy as claimed in claim 2 further including aperture size adjustment means permitting the aperture to be made smaller or larger, said aperture size adjustment means comprising means for removably securing the flaps in different positions so as to define larger or smaller sizes of aperture means.

4. A toy for use by a person to allow a person to slide upon a relatively smooth firm underlying surface such as a floor, characterized by a flexible bag forming a relatively air tight enclosure when inflated and placed upon the surface, and having a region defined by removing a substantial portion of the bottom of said flexible bag in contact with the underlying surface, whereby substantially lower friction between the surface and the bag is achieved, said toy including a closed loop of relatively stiff flexible air impermeable material having a relatively smooth inner surface, the loop having a width and a diameter sufficient to permit a person to operate the sliding toy upon the inner surface so as to cause the loop to roll.

* * * * *